(12) United States Patent
Yao

(10) Patent No.: US 12,538,403 B2
(45) Date of Patent: Jan. 27, 2026

(54) FLICKER-FREE LIGHT COLOR TEMPERATURE CHANGING SYSTEM

(71) Applicant: Chao Chin Yao, Taichung (TW)

(72) Inventor: Chao Chin Yao, Taichung (TW)

( * ) Notice: Subject to any disclaimer, the term of this patent is extended or adjusted under 35 U.S.C. 154(b) by 89 days.

(21) Appl. No.: 18/750,017

(22) Filed: Jun. 21, 2024

(65) Prior Publication Data

US 2025/0393110 A1 Dec. 25, 2025

(51) Int. Cl.
*H05B 45/59* (2022.01)
*H05B 45/20* (2020.01)

(52) U.S. Cl.
CPC ............ *H05B 45/59* (2022.01); *H05B 45/20* (2020.01)

(58) Field of Classification Search
CPC ...... H05B 45/10; H05B 45/325; H05B 45/20; H05B 45/46; H05B 45/14; H05B 45/37; H05B 47/105; H05B 47/115; H05B 47/19; H05B 45/38; H05B 45/40; H05B 47/11; H05B 47/16; H05B 47/165; H05B 47/185; H05B 39/08; H05B 45/12; H05B 45/33; H05B 45/48; H05B 45/34; H05B 45/345; H05B 45/347; H05B 45/395; H05B 45/52; H05B 45/60; H05B 47/18; H05B 47/21; H05B 47/28; H05B 39/042; H05B 39/044; H05B 45/3725; H05B 45/44; H05B 47/10; H05B 47/155; H05B 47/17; H05B 41/26; H05B 41/282; H05B 41/2822; H05B 41/3925; H05B 45/18; H05B 45/24; H05B 45/30; H05B 45/35; H05B 45/385; H05B 45/39; H05B 45/54; H05B 45/56; H05B 47/14; H05B 47/195; H05B 47/196; H05B 47/1965; H05B 44/00; H05B 45/305; H05B 45/42; H05B 47/13; H05B 47/198; H05B 47/1985
See application file for complete search history.

(56) References Cited

U.S. PATENT DOCUMENTS 12,085,263 B2 * 9/2024 Jiang .................. F21V 29/89

* cited by examiner

*Primary Examiner* — Monica C King
(74) *Attorney, Agent, or Firm* — MUNCY, GEISSLER, OLDS & LOWE, P.C.

(57) ABSTRACT

A flicker-free light color temperature changing system includes a signal sending module and a light module. The signal sending module has a power supply unit and a microcontroller unit. The light module has a light unit and a logic signal unit. When the power supply unit is operating, the power supply unit supplies a power to the microcontroller unit and the light unit, and the light unit keeps on emitting light. When the microcontroller unit sends a color temperature change command to the light unit via the logic signal unit and the drive unit, the light unit changes a color temperature in a continuous light-emitting state.

7 Claims, 1 Drawing Sheet

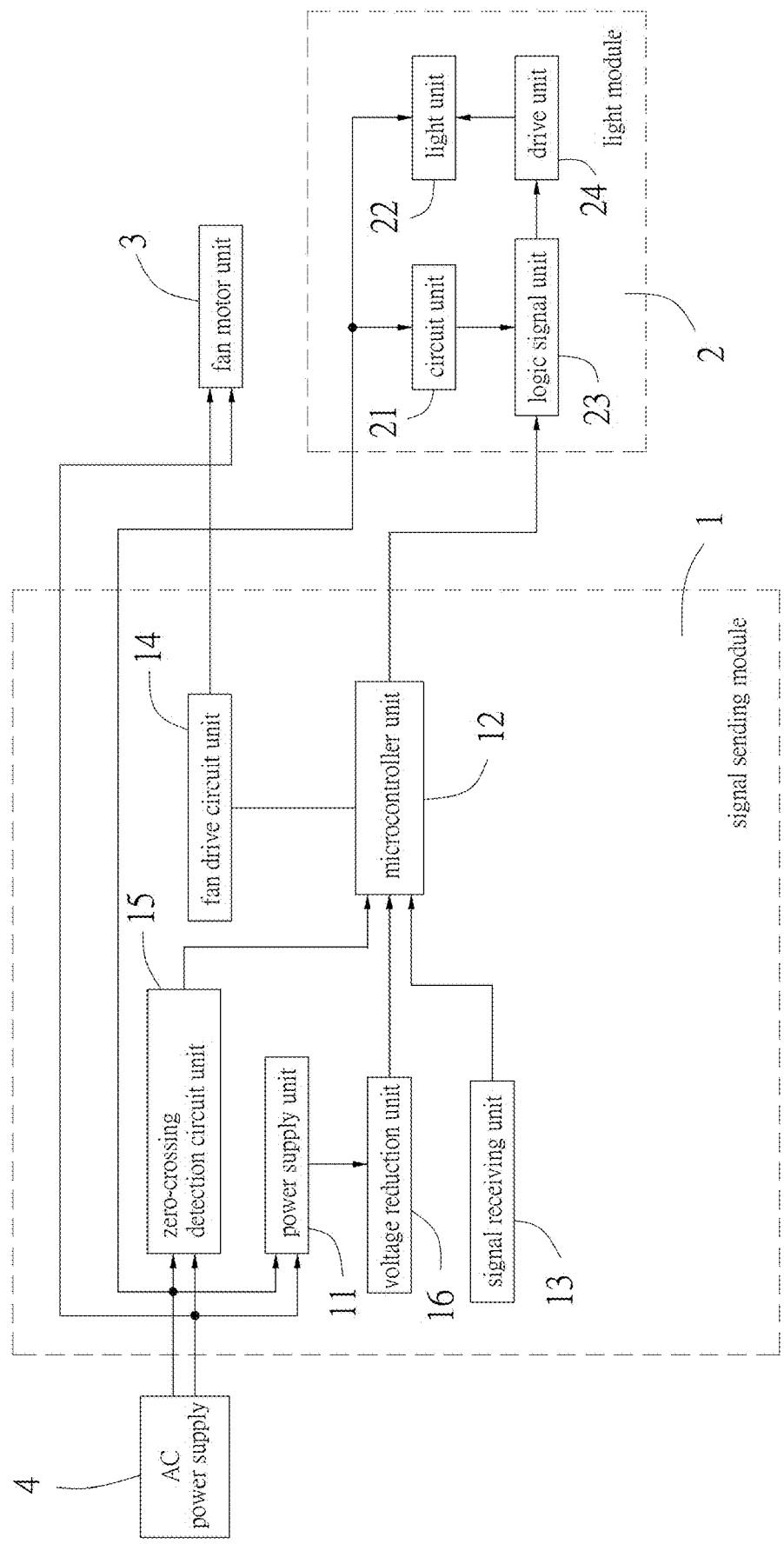

FLICKER-FREE LIGHT COLOR TEMPERATURE CHANGING SYSTEM

FIELD OF THE INVENTION

The present invention relates to a light system, and more particularly, to a light that does not flicker when the color temperature of the light is changed for the purpose of achieving a stable color change of the light.

BACKGROUND OF THE INVENTION

In a conventional light structure, the light is connected to a power source through a MCU (Microcontroller Unit). The MCU receives and transmits signals and commands the light to bring about a change in color temperature or brightness.

However, since the power source is in continuous operation, when the MCU receives a command to change the color temperature, the MCU will stop outputting the original signal for a short period of time and then output a new signal to the light to change the color temperature. At this time, the light is turned off because there is no power accompanying the signal from the MCU. After the MCU inputs a new signal, the light will emit light with the corresponding color temperature. A flicker occurs during the power interruption, which adversely affects the lighting or display function.

Accordingly, the inventor of the present invention has devoted himself based on his many years of practical experiences to solve these problems.

SUMMARY OF THE INVENTION

The primary object of the present invention is to provide a flicker-free light color temperature changing system.

In order to achieve the foregoing object, the flicker-free light color temperature changing system provided by the present invention comprises a signal sending module and a light module.

The signal sending module includes a power supply unit, a microcontroller unit, and a signal receiving unit.

The light module includes a circuit unit, a light unit, a logic signal unit, and a drive unit.

The power supply unit supplies a power to the microcontroller unit, the circuit unit and the light unit. The signal receiving unit is connected to the microcontroller unit for transmitting a control signal from the signal receiving unit to the microcontroller unit. The microcontroller unit is connected to the logic signal unit.

Because the light unit obtains the power directly from the power supply unit, when the power supply unit is operating, the light unit keeps on emitting light, when the microcontroller unit sends a color temperature change command to the light unit via the logic signal unit and the drive unit, the light unit changes a color temperature in a continuous light-emitting state, so as to avoid a flickering phenomenon due to power discontinuity of the light unit.

BRIEF DESCRIPTION OF THE DRAWINGS

Sole FIGURE is a schematic diagram showing the system relationship of the present invention.

DETAILED DESCRIPTION OF THE PREFERRED EMBODIMENTS

As shown in the sole FIGURE, the present invention discloses a flicker-free light color temperature changing system, comprising a signal sending module 1 and a light module 2. The signal sending module 1 includes a power supply unit 11, a microcontroller unit (MCU), and a signal receiving unit 13. The light module 2 includes a circuit unit 21, a light unit 22, a logic signal unit 23, and a drive unit 24.

The power supply unit 11 supplies a power to the microcontroller unit 12, the circuit unit 21 and the light unit 22. The signal receiving unit 13 is connected to the microcontroller unit 12 for transmitting a control signal from the signal receiving unit 13 to the microcontroller unit 12. The microcontroller unit 12 is connected to the logic signal unit 23. The signal receiving unit 13 receives and transmits a wireless signal. For example, a remote control or a mobile device sends a wireless signal to the signal receiving unit 13, and then the signal receiving unit 13 transmits the wireless signal to the microcontroller unit 12.

The light unit 22 obtains the power directly from the power supply unit 11. When the power supply unit 11 is operating, the light unit 22 will keep on emitting light. When the microcontroller unit 12 sends a color temperature change command to the light unit 22 via the logic signal unit 23 and the drive unit 24, the light unit 22 will change the color temperature in a continuous light-emitting state, so as to avoid a flickering phenomenon due to power discontinuity of the light unit 22. As long as the power supply unit 11 remains in operation, the light unit 22 will be powered by the power supply unit 11 to emit light. At this time, the light unit 22 will directly generate a color change because of the color temperature change command received by the microcontroller unit 12 (via the logic signal unit 23 and the drive unit 24), without power interruption due to the conversion of new and old color temperature signals from the microcontroller unit 12. This prevents flickers when the color temperature changes, which has a stabilizing effect on the lighting and display functions and does not cause discomfort to users in the environment.

The microcontroller unit 12 is connected to a fan drive circuit unit 14. The fan drive circuit unit 14 is connected to a fan motor unit 3. The microcontroller unit 12 generates an operation signal through the fan drive circuit unit 14 to command the fan motor unit 3 to operate, so that the microcontroller unit 12 controls the operations of the fan motor unit 3 and the light module 2 simultaneously. A zero-crossing detection circuit unit 15 is connected to the microcontroller unit 12 and the fan drive circuit unit 14, and the zero-crossing detection circuit unit 15 is connected to an external AC power supply 4, so as to monitor the electric arc reaction generated when the fan drive circuit unit 14 is switched by the microcontroller unit 12 to determine whether to prevent power failure for protection. Therefore, the present invention integrates the light module 2 with the fan motor unit 3, so that the microcontroller unit 12 can control the fan motor unit 3 and the light module 2 simultaneously.

The power supply unit 11 includes a rectifier (not shown) to convert AC voltage of the external AC power supply 4 into DC voltage for the microcontroller unit 12, the circuit unit 21 and the light unit 22. The power supply unit 11 is connected to a voltage reduction unit 16. The voltage reduction unit 16 reduces the DC voltage supplied by the power supply unit 11 for the microcontroller unit 12. The circuit unit 21 also reduces the DC voltage supplied by the power supply unit 11 for the logic signal unit 23, such that the microcontroller unit 12 and the logic signal unit 23 operate at the appropriate voltage.

In addition, the light unit 22 includes a plurality of LEDs (not shown). The logic signal unit 23 commands different LEDs to emit corresponding color temperatures through the drive unit 24, thereby bringing a color mixing effect by matching LEDs with different color temperatures. The circuit unit 21 is likewise directly connected to the power supply unit 11, so that the logic signal unit 23 is also powered continuously and directly. There is no need for the power accompanying the control signals from the microcontroller unit 12.

In the present invention, the power supply unit 11 directly supplies the power to the light unit 22, so that the lamp unit 22 keeps on emitting light. When the microcontroller unit 12 transmits a color temperature change command, the light unit 22 will directly generate a color change with the corresponding color temperature, without power interruption caused by the microcontroller unit 12 due to the conversion of the old and new signals, so of course, there is no flicker phenomenon.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A flicker-free light color temperature changing system, comprising:

a signal sending module, including a power supply unit, a microcontroller unit and a signal receiving unit;

a light module, including a circuit unit, a light unit, a logic signal unit and a drive unit;

the power supply unit supplying a power to the microcontroller unit, the circuit unit and the light unit, the signal receiving unit being connected to the microcontroller unit for transmitting a control signal from the signal receiving unit to the microcontroller unit, the microcontroller unit being connected to the logic signal unit;

the circuit unit transmitting the power to the logic signal unit, the microcontroller unit translating and transmitting the control signal to the logic signal unit, the logic signal unit generating a color temperature adjustment signal to the drive unit, the drive unit commanding the light unit to change a color temperature;

wherein because the light unit obtains the power directly from the power supply unit, when the power supply unit is operating, the light unit keeps on emitting light, when the microcontroller unit sends a color temperature change command to the light unit via the logic signal unit and the drive unit, the light unit changes the color temperature in a continuous light-emitting state, so as to avoid a flickering phenomenon due to power discontinuity of the light unit.

2. The flicker-free light color temperature changing system as claimed in claim 1, wherein the microcontroller unit is connected to a fan drive circuit unit, the fan drive circuit unit is connected to a fan motor unit, the microcontroller unit generates an operation signal through the fan drive circuit unit to command the fan motor unit to operate, so that the microcontroller unit controls operations of the fan motor unit and the light module simultaneously.

3. The flicker-free light color temperature changing system as claimed in claim 1, wherein the power supply unit includes a rectifier to convert an AC voltage of an external AC power supply to a DC voltage for the microcontroller unit, the circuit unit and the light unit.

4. The flicker-free light color temperature changing system as claimed in claim 1, wherein the power supply unit is connected to a voltage reduction unit, and the voltage reduction unit reduces a DC voltage supplied by the power supply unit for the microcontroller unit.

5. The flicker-free light color temperature changing system as claimed in claim 1, wherein the circuit unit reduces a DC voltage supplied by the power supply unit for the logic signal unit.

6. The flicker-free light color temperature changing system as claimed in claim 2, wherein a zero-crossing detection circuit unit is connected to the microcontroller unit and the fan drive circuit unit, and the zero-crossing detection circuit unit is connected to an external AC power supply.

7. The flicker-free light color temperature changing system as claimed in claim 1, wherein the circuit unit is directly connected to the power supply unit.

* * * * *